US006615125B2

(12) United States Patent  
Eccleston et al.

(10) Patent No.: US 6,615,125 B2
(45) Date of Patent: *Sep. 2, 2003

(54) BRAKE CONTROL UNIT

(75) Inventors: Larry Eccleston, Marshall, MI (US); Chandrakumar D. Kulkarni, Battle Creek, MI (US); Bruce E. Smith, Leo, IN (US); Marcia S. Albright, Coldwater, MI (US)

(73) Assignee: Tekonsha Towing Systems, Inc., Tekonsha, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/138,211

(22) Filed: May 3, 2002

(65) Prior Publication Data

US 2002/0123837 A1 Sep. 5, 2002

Related U.S. Application Data

(63) Continuation-in-part of application No. 09/718,763, filed on Nov. 22, 2000, now Pat. No. 6,445,993.

(51) Int. Cl.[7] ................................................. G06F 7/70
(52) U.S. Cl. ............................... 701/70; 340/438; 303/7
(58) Field of Search ............................. 701/70, 29, 31, 701/20, 124, 181; 340/438, 439, 461; 303/7

(56) References Cited

U.S. PATENT DOCUMENTS

| 2,228,631 A | 1/1941 | Kuiper |
| 3,519,805 A | 7/1970 | Thorne-Booth |
| 3,601,794 A | 8/1971 | Blomenkamp et al. |
| 3,738,710 A | 6/1973 | Pokrinchak et al. |
| 3,780,832 A | 12/1973 | Marshall |
| 3,897,979 A | 8/1975 | Vangalis et al. |
| 3,908,782 A | 9/1975 | Lang et al. |
| 3,909,075 A | 9/1975 | Pittet, Jr. et al. |
| 3,953,084 A | 4/1976 | Pittet, Jr. et al. |
| 3,955,652 A | 5/1976 | Nilsson et al. |
| 3,967,863 A | 7/1976 | Tomecek et al. |
| 3,981,542 A | 9/1976 | Abrams et al. |
| 3,981,544 A | 9/1976 | Tomecek et al. |
| 4,030,756 A | 6/1977 | Eden |
| 4,042,810 A | 8/1977 | Mosher |
| 4,043,608 A | 8/1977 | Bourg et al. |
| 4,050,550 A | 9/1977 | Grossner et al. |
| 4,084,859 A | 4/1978 | Bull et al. |
| 4,122,434 A | 10/1978 | Jensen |
| 4,277,895 A | 7/1981 | Wiklund |
| 4,295,687 A | 10/1981 | Becker et al. |
| 4,386,427 A | 5/1983 | Hosaka |
| 4,398,252 A | 8/1983 | Frait |
| 4,402,047 A | 8/1983 | Newton et al. |
| 4,550,372 A | 10/1985 | Kahrs |
| 4,587,655 A | 5/1986 | Hirao et al. |
| 4,660,418 A | 4/1987 | Greenwood et al. |
| 4,721,344 A | 1/1988 | Frait et al. |
| 4,722,576 A | 2/1988 | Matsuda |
| 4,726,627 A | 2/1988 | Frait et al. |
| 4,836,616 A | 6/1989 | Roper et al. |
| 4,849,655 A | 7/1989 | Bennett |
| 4,850,656 A | 7/1989 | Ise et al. |

(List continued on next page.)

*Primary Examiner*—Marthe Y. Marc-Coleman
(74) *Attorney, Agent, or Firm*—Price Heneveld Cooper DeWitt & Litton

(57) ABSTRACT

A brake control unit for providing a brake output signal to a brake load includes a processor, an accelerometer and a memory subsystem. The accelerometer is coupled to the processor and provides a brake control signal to the processor, which is configured to provide the brake output signal to the brake load in response to the brake control signal. The memory subsystem is coupled to the processor and stores processor executable code, which causes the processor to automatically set at least one of a gain level and a boost level for the brake control unit.

24 Claims, 8 Drawing Sheets

U.S. PATENT DOCUMENTS

| | | |
|---|---|---|
| 4,856,850 A | 8/1989 | Aichele et al. |
| 5,002,343 A * | 3/1991 | Brearley et al. ............... 303/7 |
| 5,032,821 A | 7/1991 | Domanico et al. |
| 5,044,697 A | 9/1991 | Longyear et al. |
| 5,050,937 A | 9/1991 | Eccleston |
| 5,050,940 A | 9/1991 | Bedford et al. |
| 5,058,960 A | 10/1991 | Eccleston et al. |
| 5,139,315 A | 8/1992 | Walenty et al. |
| 5,149,176 A | 9/1992 | Eccleston |
| 5,255,962 A | 10/1993 | Neuhaus et al. |
| 5,333,948 A | 8/1994 | Austin et al. |
| 5,352,028 A * | 10/1994 | Eccleston ................... 303/20 |
| 5,606,308 A | 2/1997 | Pinkowski |
| 5,615,930 A | 4/1997 | McGrath et al. |
| 5,620,236 A | 4/1997 | McGrath et al. |
| 5,741,048 A | 4/1998 | Eccleston |
| 5,785,393 A | 7/1998 | McGrath et al. |
| 5,949,147 A | 9/1999 | McGrath et al. |
| 6,012,780 A | 1/2000 | Duvernay |
| 6,039,410 A | 3/2000 | Robertson et al. |
| 6,068,352 A | 5/2000 | Kulkarni et al. |
| 6,445,993 B1 * | 9/2002 | Eccleston et al. ............. 701/70 |

* cited by examiner

200

BRAKE CONTROL UNIT

CROSS-REFERENCE TO RELATED APPLICATION

This application is a continuation-in-part of U.S. patent application Ser. No. 09/718,763 (now U.S. Pat. No. 6,445, 993), entitled "BRAKE CONTROL UNIT" to Larry Eccleston et al., filed Nov. 22, 2000, the entire disclosure of which is hereby incorporated herein by reference.

BACKGROUND OF THE INVENTION

The present invention is directed to a brake control unit, and more specifically to an improved brake control unit for providing a brake output signal to a brake load of a towed vehicle.

Various prior art brake control units have included a display to provide an operator of a towing vehicle with various information. These displays have included a plurality of light emitting diodes (LEDs) and/or one or more seven-segment displays. The LED type display has typically provided an indication of the magnitude of the output (i e., a brake output signal) of the brake control unit and the seven-segment type display has generally provided a numerical value for the brake output signal. While some prior art brake control units have provided status and diagnostic information, the status and diagnostic information has been somewhat limited. For example, information provided through a plurality of LEDs has required an operator of the towing vehicle to decode the meaning of the LEDs to determine what information the brake control unit was attempting to provide to the operator.

Some prior art brake control units have also included a processor for receiving a brake control signal from an accelerometer. The brake control signal provided by the accelerometer has been utilized to determine when the towing vehicle was decelerating so that a brake output signal (e.g., an energizing current) could be applied to a brake load (i.e., brake electromagnets) of a towed vehicle (e.g., a trailer), in response to the deceleration of the towing vehicle. These prior art brake control units have typically required an operator of the towing vehicle to set or adjust, by mechanical means, a reference level of the accelerometer; when the brake control unit was initially mounted or changed to a different mounting orientation. These accelerometers typically only functioned over a small range and required leveling to be on the edge of detection. In general, prior art brake control units have not accounted for changes in the accelerometer output (i.e., the brake control signal) due to temperature variation. In addition, prior art brake control units have only provided a brake output signal to a brake load of the towed vehicle when the towing vehicle was moving in a forward direction. As such, the brakes of the towing vehicle have been required to hold the towed vehicle when the towing vehicle was stopped on an incline and to stop the towed vehicle when the towing vehicle was backing-up.

What is needed is a brake control unit that eliminates the need to manually adjust the level of the accelerometer when the brake control unit is initially mounted or changed to a different mounting orientation. Additionally, it would be desirable for the brake control unit to automatically adjust for the changes in the accelerometer output that are due to temperature variations. Further, it would be desirable for the brake control unit to display a wide range of status and diagnostic information to an operator of the towing vehicle. In addition, it would be desirable for the brake control unit to provide a proportional brake output signal to a brake load of a towed vehicle when stopping in reverse and a fixed brake output signal when the towing vehicle is stopped with the brake pedal depressed. Furthermore, it would also be desirable for the brake control unit to be capable of automatically setting a gain level and/or boost level for the brake control unit.

SUMMARY OF THE INVENTION

An embodiment of the present invention is directed to a brake control unit for providing a brake output signal to a brake load of a towed vehicle and includes a processor, an accelerometer and a memory subsystem. The accelerometer is coupled to the processor and provides a brake control signal to the processor. The processor is programmed to cause an appropriate brake output signal to be provided to the brake load responsive to the brake control signal. The memory subsystem is coupled to the processor and stores processor executable code which causes the processor to automatically set at least one of a gain level and a boost level for the brake control unit.

According to another embodiment of the present invention, brake control code causes the processor to perform a number of steps. First, the processor causes a brake output signal to be provided to the brake load of the towed vehicle when a brake pedal of a towing vehicle is depressed and before brakes of the towing vehicle can respond to the depression of the brake pedal. Next, the processor detects a deceleration in the towed vehicle attributable to the brake output signal. The detected deceleration provides an indication of towed vehicle characteristics. Finally, the processor sets the gain level for the brake control unit responsive to the detected deceleration associated with the brake output signal.

In yet another embodiment of the present invention, the brake control code causes the processor to perform the additional step of setting the boost level for the brake control unit responsive to the detected deceleration associated with the brake output signal. The boost level causes an increased initial braking force to be applied to the brake load, when utilized. The towed vehicle characteristics may include items such as brake temperature, brake pad wear, proximity of brake pads to brake drum, brake magnet strength, brake spring strength, number of axles, load and speed and the detected deceleration may also provide an indication of road conditions.

According to yet another embodiment of the present invention, the brake output signal is modulated at a given rate to provide an average deceleration for use in setting the gain level for the brake control unit to an appropriate level.

These and other features, advantages and objects of the present invention will be further understood and appreciated by those skilled in the art by reference to the following specification, claims, and appended drawings.

DETAILED DESCRIPTION OF PREFERRED EMBODIMENT(S)

A brake control unit, according to the present invention, includes a processor, a memory subsystem and an accelerometer, which contains no mechanically adjustable components. The accelerometer provides a brake control signal that is used by the processor to determine the deceleration of a towing vehicle. The processor is also coupled to the memory subsystem. Preferably, the memory subsystem stores calibration data used by the processor to automatically adjust the offset of the brake control signal to properly center the output curve to account for variations in the brake control signal that are due to initial offset and temperature variations of the accelerometer. The brake control unit, preferably, also includes a dual seven-segment display, which provides improved status and diagnostic information to an operator of the towing vehicle. The brake control unit provides a brake output signal to a brake load (i.e., brake electromagnets) of a towed vehicle (i.e., a trailer) responsive to the brake control signal. Preferably, the brake control unit also provides a proportional brake output signal to the brake load when the towing vehicle is backing-up or a fixed brake output signal when it is completely stopped with the brake pedal depressed, for example, on an incline. This is advantageous in that the brakes of the towing vehicle are not required to stop or hold the towed vehicle, when the towing vehicle is backing-up or is stopped on an incline.

Figure 1A:
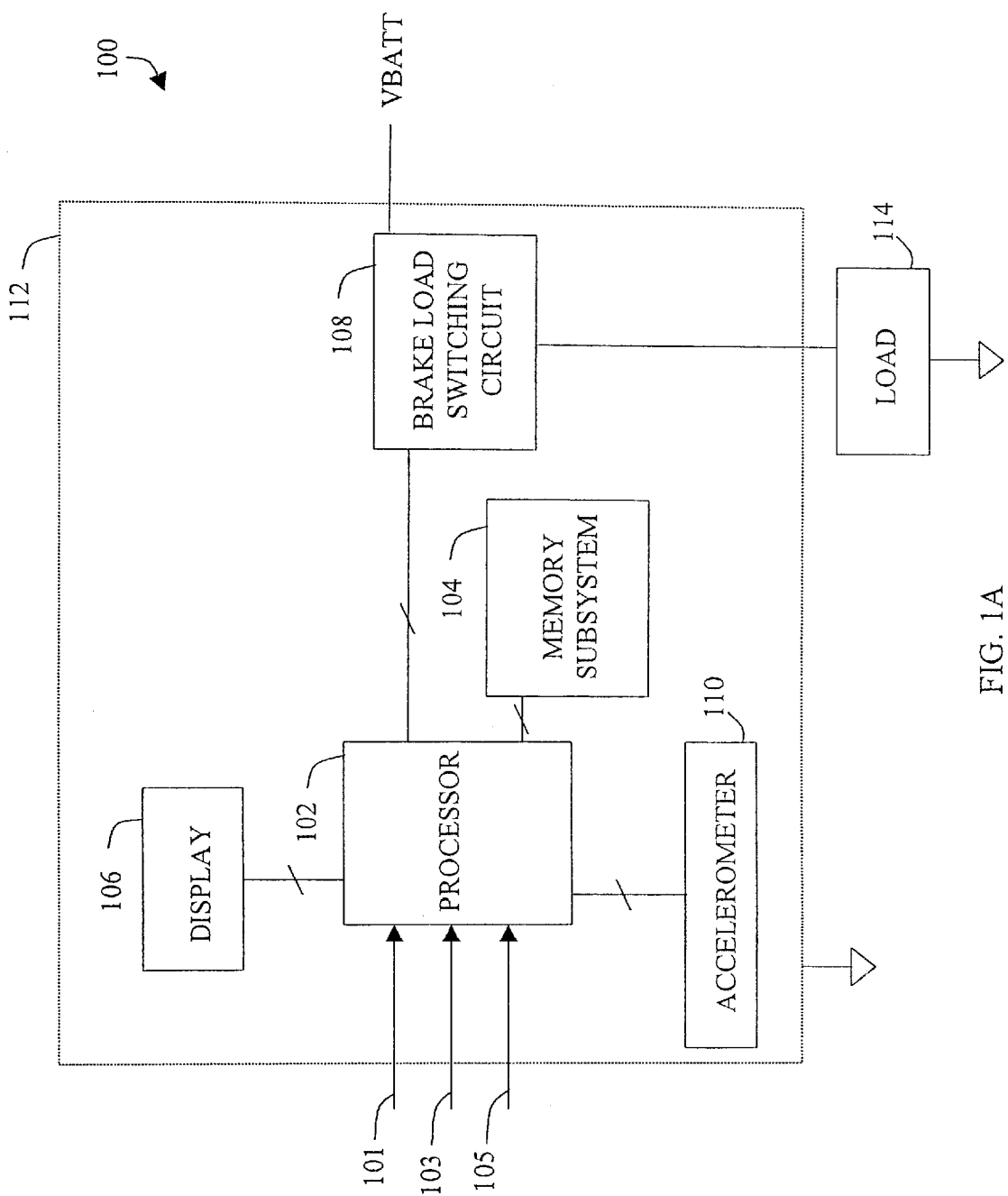
FIG. 1A is an electrical block diagram of a brake control unit, according to an embodiment of the present invention.

As is shown in FIG. 1A, a brake control unit 100 includes a processor 102, which is coupled to a memory subsystem 104, a display 106, an accelerometer 110 and a brake load switching circuit 108, which are all preferably mounted on a printed circuit board (PCB) 112. As used herein, the term "processor" may include a general purpose processor, a is microcontroller (i.e., an execution unit with memory, etc., integrated within an integrated circuit), a digital signal processor (DSP), a programmable logic device (PLD) or an application specific integrated circuit (ASIC). The processor 102 may receive a manual input signal 101, a gain input signal 103 and a boost input toggle signal 105, among other input signals (not shown in FIG. 1A). As in other brake control units, a wiper of a potentiometer coupled between a supply voltage (i.e., derived from a vehicle battery VBATT) and ground, preferably, provides the manual input signal 101 to a manual input of the processor 102. This allows an operator of the towing vehicle to apply a brake output signal to the brake load 114 of the towed vehicle without engaging the brakes of the towing vehicle. Similarly, a wiper of a rotary potentiometer that is coupled between a supply voltage (i.e., derived from a vehicle battery VBATT) and ground may provide the gain input signal 103 to a gain input of processor 102. The gain input signal 103 allows an operator of the towing vehicle to adjust the maximum magnitude (i.e., the duty cycle) of the brake output signal provided, via the brake load switching circuit 108, to the brake load (i.e., brake electromagnets) 114 of the towed vehicle (e.g., a trailer).

According to one embodiment of the present invention, a boost switch coupled to a boost input of the processor 102, when actuated, causes the processor 102 to toggle between normal operation and providing an increased initial brake output signal to the brake load 114 of the towed vehicle. Preferably, when the boost switch (SW1, see FIG. 2A) toggles the boost on, processor 102 provides an initial brake output signal that is equal to a fraction of the maximum brake output signal currently set by the gain input signal 103. The boost switch advantageously allows the operator to add an additional brake output signal at the start of a braking event to compensate for different trailers, trailer weight or other different braking conditions (e.g., wet or dry road conditions). This allows a vehicle operator to provide a more aggressive brake setting when the brake control unit is utilized with, for example, heavy multi-axle trailers. Alternatively, a variable boost (e g., set with a potentiometer) or incrementally stepped values can be employed.

The display 106 is preferably a dual seven-segment display, which provides information to the operator of the vehicle in the form of alphanumeric characters. As mentioned above, the accelerometer 110 provides a brake control signal to processor 102, which the processor 102 utilizes in determining the magnitude of the brake output signal to apply to the brake load 114 of the towed vehicle. As mentioned above, the brake output signal is applied by the brake load switching circuit 108, of which one embodiment is further described below in conjunction with FIGS. 2A–2B.

Figure 1B:
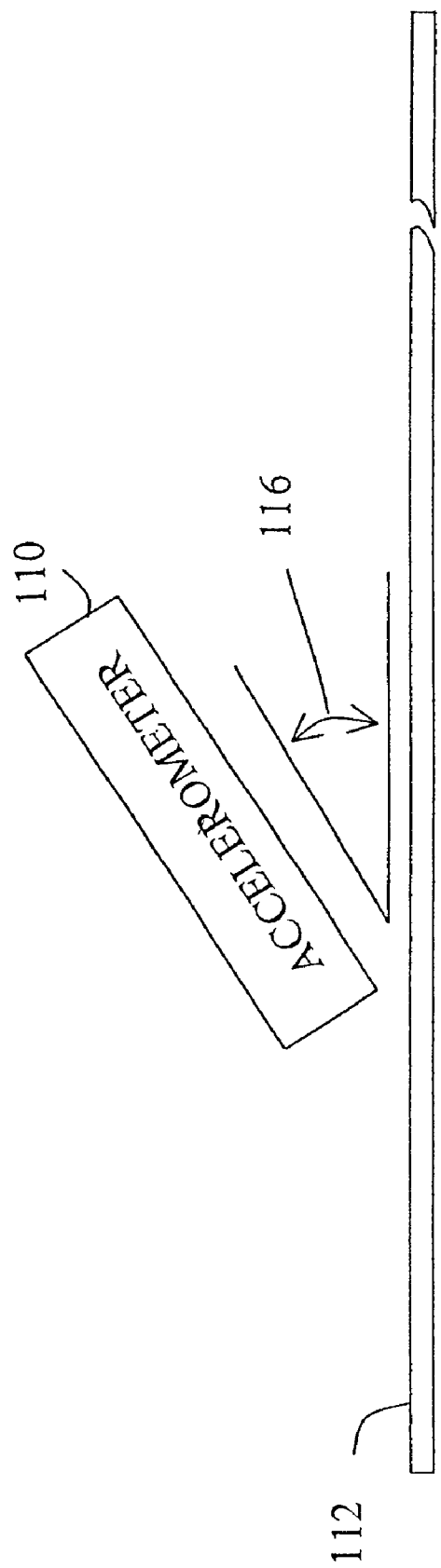
FIG. 1B is a diagram depicting the mounting relationship of an accelerometer with respect to a printed circuit board (PCB) of the brake control unit of FIG. 1A, according to an embodiment of the present invention.

As shown in FIG. 1B, the accelerometer 110 is preferably mounted at an angle 116 with respect to the PCB 112. Mounting the accelerometer 110 at an angle (nominally, forty-five degrees) 116 with respect to the PCB 112 advantageously allows the mounting range of the brake control unit 100 to be offset. That is, when the brake control unit 100 is mounted at an angle of forty-five degrees (i.e., clockwise) with respect to horizontal, the accelerometer 110 is horizontal. Depending upon the application, accelerometer angles other than forty-five degrees may prove beneficial.

As is typical with brake control units, the brake control unit 100 is intended for under dashboard mounting. As designed, the brake control unit 100 has a relatively wide mounting range. However, the optimum-mounting angle is forty-five degrees with a minimum preferred mounting angle of zero degrees and a maximum preferred mounting angle of seventy degrees. When the brake control unit 100 is mounted outside of its preferred operating range, the processor 102 is preferably programmed to activate the display 106 such that appropriate upper or lower horizontal segments of each seven-segment display 406 and 408 flash to indicate in which direction the brake control unit 100 has exceeded its mounting range (see FIGS. 4M and 4O).

Figure 4A:
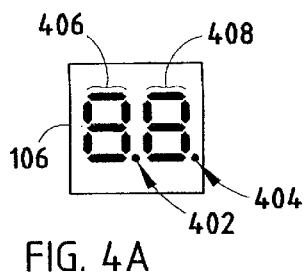
FIGS. 4A–4O are front views of a display providing a wide range of exemplary status and diagnostic information to an operator of a towing vehicle.
Figure 4F:
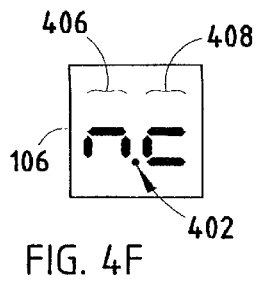

In a preferred embodiment, the display 106 provides both a brake output signal level and other diagnostic or warning conditions. For example, FIG. 4A depicts a typical output of the display 106 during normal operation when the boost switch is asserted. As shown in FIG. 4A, the display 106 indicates a brake output signal level of 8.8 volts with a first seven-segment display 406 indicating an '8' and a second seven-segment display 408 indicating an '8', where a power indicator 402 serves as a decimal point and a boost indicator 404 is also illuminated to indicate that the boost switch has been asserted. When providing the output signal level, the display 106 preferably becomes active upon movement of a manual control or activation of a towing vehicle stop light switch (as is further discussed with respect to FIGS. 2A–2B) As depicted in FIG. 4B, when the unit 100 is active, the indicator 402 is on, indicating that power is applied to the brake control unit 100. When a trailer is not connected and the manual control is operated, the display 106 indicates 'n.c' (see FIG. 4F). When a trailer is connected, the display 106 changes to indicate '.c' (see FIG. 4C). When a trailer is connected and the manual control is operated, the display 106 indicates the brake output signal level in one-tenth increments up to ten volts and in one volt increments from ten volts to sixteen volts.

Figure 4K:
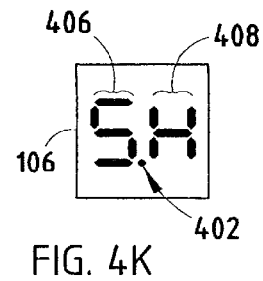
Figure 4B:
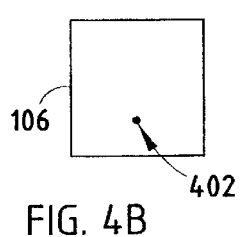

If the processor 102 detects a shorted output, the display 106 provides a 'S.H', which is flashed every one-half second (see FIG. 4K). If the processor 102 detects a current overload, it provides an 'O.L' on the display 106, which flashes at a rate of one-half second (see FIG. 4L) When the processor 102 determines that an open ground exists, it causes display 106 to provide an 'O.G', which flashes every one-half second (see FIG. 4N). When the processor 102 is powered and the boost input toggle signal is asserted, both decimal points 402 and 404 are illuminated (see FIG. 4D).

Figure 4G:
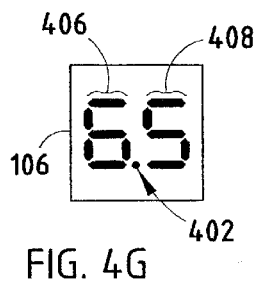
Figure 4L:
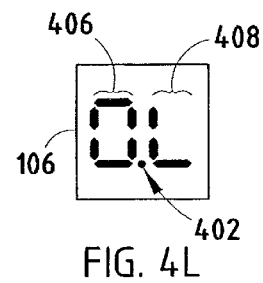
Figure 4C:
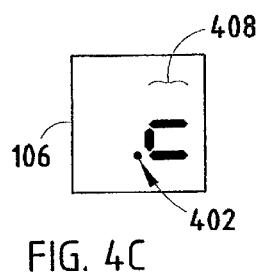
Figure 4H:
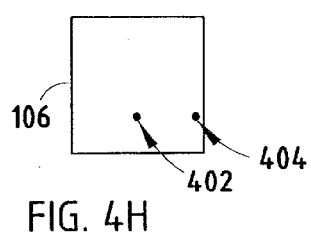
Figure 4M:
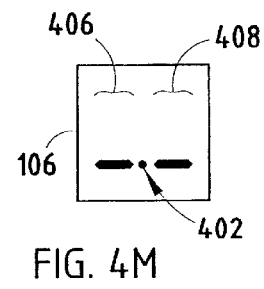
Figure 4D:
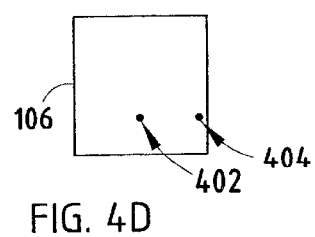
Figure 4I:
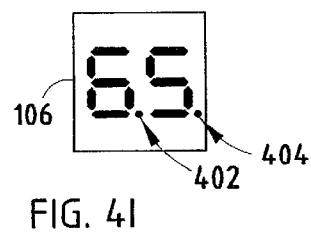
Figure 4N:
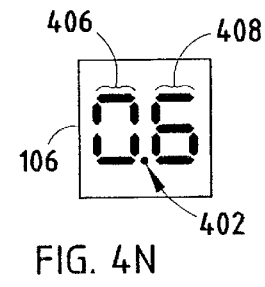
Figure 4E:
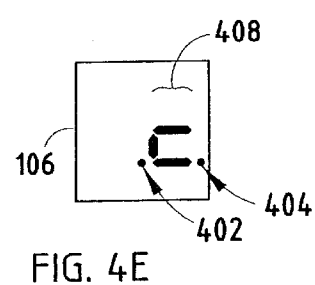
Figure 4J:
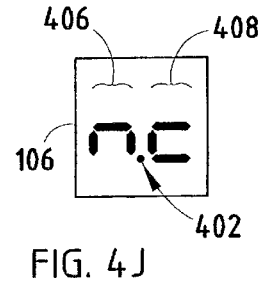
Figure 4O:
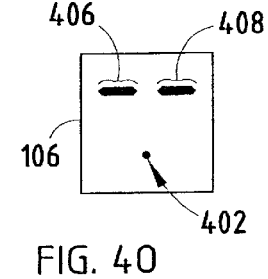

As shown in FIG. 4E, display 106 provides '.c.' when a trailer is connected and the boost switch has been asserted. FIG. 4G depicts a typical brake output voltage on display 106 of '6.5' volts during a braking event when the trailer is connected. The display 106 provides the indication, shown in FIG. 4B when a trailer is not connected during a braking event. FIG. 4I depicts a display 106 providing a brake output signal level of '6.5' volts when the boost switch has been asserted. If during operation of the towing vehicle the trailer connection changes from connected to not connected, the display 106 provides the indication 'n.c' flashed every one-half second as shown in FIG. 4J.

Figure 2A:
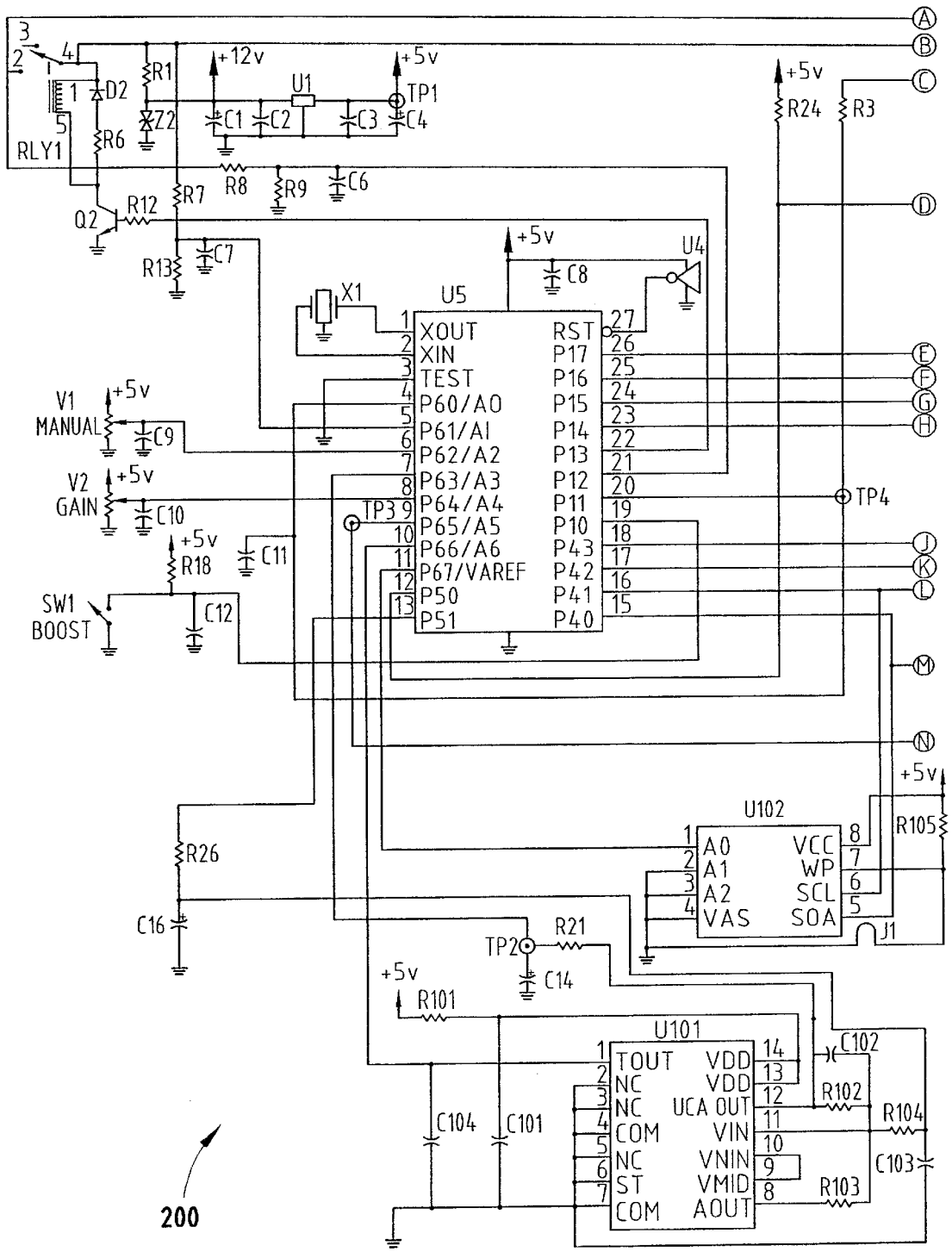
FIGS. 2A–2B are an electrical schematic diagram of a brake control unit, according to an embodiment of the present invention.
Figure 2B:
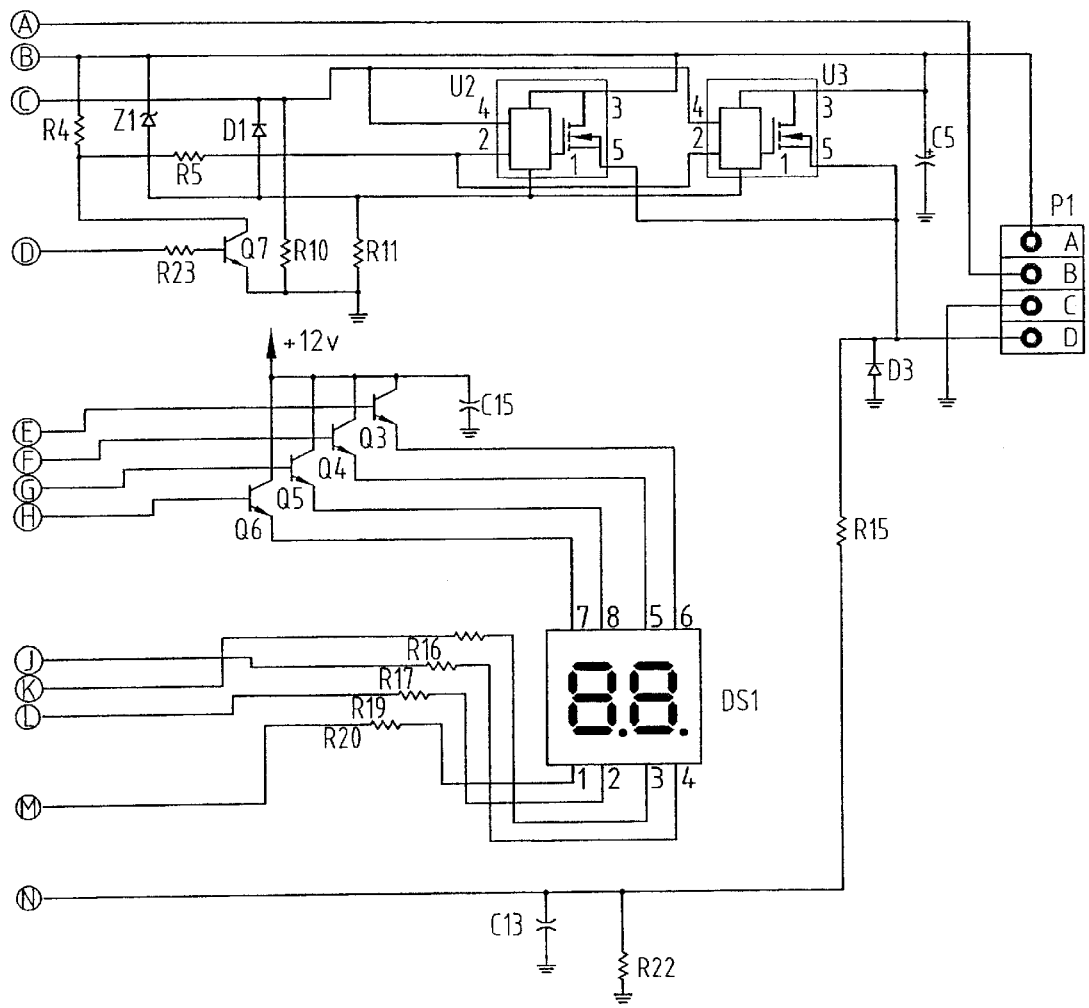

Moving to FIGS. 2A–2B, an electrical schematic of a preferred brake controller 200 is illustrated, according to one embodiment of the present invention. In the embodiment of FIGS. 2A–2B, the processor 102 and portions of the memory subsystem 104, of FIG. 1A, are implemented as a microcontroller U5. The microcontroller U5 receives a manual input signal (on pin 6) from a potentiometer (i.e., a manual control) Vi and a gain input signal (on pin 8) from a potentiometer (i.e., a gain control) V2. When a boost switch SW1 is asserted, a boost input toggle signal, as described above, is received on pin 19 of the microcontroller U5. A suitable microcontroller is manufactured and made commercially available by the Toshiba Corporation (part no. TMP87C809). The TMP87C809 includes 8K of internal read-only memory (ROM), two-hundred fifty-six bytes of internal random access memory (RAM), six internal LED drivers, eight ten-bit analog-to-digital (A/D) converter channels, one sixteen-bit timer/counter, two eight-bit timer/counters and twenty-two I/O ports.

The microcontroller U5 monitors the towing vehicle stoplight switch (via connector P1, pin B) on pin 21 via a divider/filter network including a resistor R8, a resistor R9 and a capacitor C6, whose values are preferably 10 k $\Omega$, 22 k $\Omega$ and 01 $\mu$F, respectively. The microcontroller U5 monitors the brake output signal (provided to the brake load via connector P1, pin D and pin C (ground)) on pin 9 via a divider/filter network including a resistor R15, a resistor R22 and a capacitor C13, whose values are preferably 22 k $\Omega$, 10 k $\Omega$ and 4.7 $\mu$F, respectively.

An accelerometer U101 is coupled to the microcontroller U5 and, as is mentioned above, provides a brake control signal to the microcontroller U5. A suitable accelerometer is manufactured and made commercially available by Analog Devices, Inc (part no. ADXL105). The ADXL105 is a single-axis acceleration measurement system including a temperature sensor, a single-axis accelerometer and an uncommitted operational amplifier incorporated on a monolithic integrated circuit. The output of the single-axis accelerometer is coupled, through a resistor R103 (preferably 20.0 k $\Omega$), to a negative input of the operational amplifier. A positive input of the operational amplifier is coupled to an internal reference (via a connection between pins 9 and 10 of the accelerometer U101), whose value is equal to VDD/2. An output of the operational amplifier is coupled to the microcontroller U5 (on pin 7) through a filter network including a resistor R21 and a capacitor C14, whose values are preferably 47 k $\Omega$ and 47 $\mu$F. As determined by the data stored in U6, read via pin 11, and the temperature of the accelerometer, read via pin 10, the microcontroller U5 provides a pulse width modulated (PWM) signal via pin 13. This PWM signal is filtered to provide a direct current (DC) offset current to the negative input of the operational amplifier through a filter network including a resistor R26, a capacitor C16, a capacitor C103, and a resistor R104, whose values are preferably 10 k $\Omega$, 4.7 $\mu$F, 0.1 $\mu$F and 69.8 k $\Omega$, respectively.

The accelerometer U101 is calibrated in the factory to determine initial offset from 2.5 volts (when the accelerometer is horizontal) and any offset drift due to temperature. This information is stored in U6 and then the write protect on U6 is enabled by removing R25. The accelerometer U101 is calibrated while mounted with the sensitive axis horizontal so the acceleration of gravity produces no acceleration in the sensitive axis. When the offset is compensated in this position the output (i.e., the operating point) of the amplifier is 2.5 volts.

A resistor R102 and a capacitor C102 (whose values are preferably 200 k $\Omega$ and 0.1 $\mu$F) form a feedback filter network between the output and the negative input of the operational amplifier and in conjunction with R103 set the gain and frequency response of the amplifier The microcontroller U5 is programmed to periodically determine the output of the accelerometer U101, by reading the level of a signal at pin 7. As used in the unit 200, the amplifier gain is set such that accelerometer U101 provides a brake control signal that varies between zero volts (at –1G) and five volts (at +1G) with two and one-half volts corresponding to no acceleration (i.e., 0G with the accelerometer level). That is, the accelerometer preferably provides a brake control signal level of two and one-half volts when no acceleration is detected and the brake control unit is mounted at forty-five degrees to horizontal.

Figure 3A:
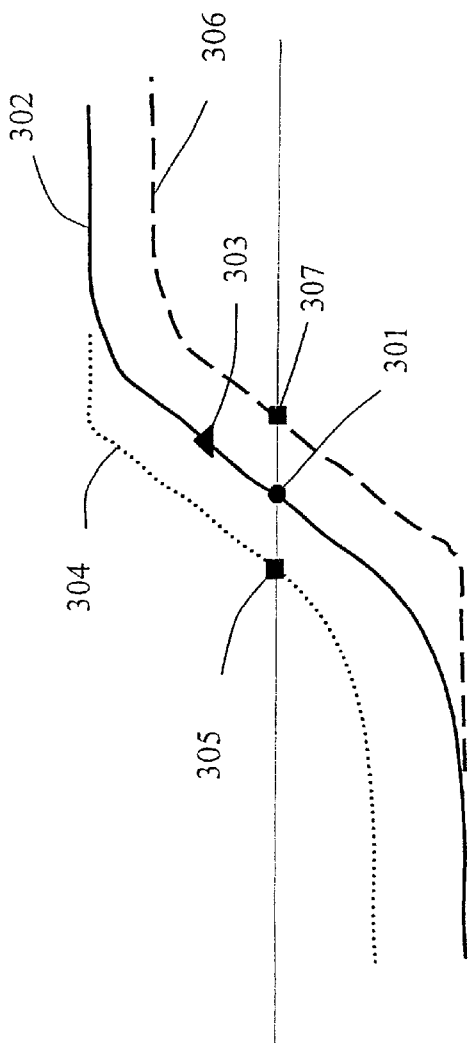
FIG. 3A is a diagram of exemplary brake control signals provided by an accelerometer.

FIG. 3A shows the effect any offset would have on the output signal. The center curve relates the output of the amplifier with no offset as the sensitive axis is rotated from straight up to straight down. This causes the accelerometer to detect the acceleration of gravity from —1G to +1G. The output traverses from near zero to near +5 volts in a sinusoidal form since the acceleration sensed is G sinθ. As can be seen, if an offset exists the curve is pushed up or down and the useful range is limited.

The microcontroller U5 also receives a temperature output signal (on pin 10) from the accelerometer U101, which is utilized for temperature compensation of the accelerometer U101. The microcontroller U5 is also coupled to a non-volatile memory (e.g., an electrically erasable programmable read-only memory (EEPROM)) U102, which stores offset and temperature calibration factors for the accelerometer U101. In this manner, microcontroller U5 can determine the temperature of accelerometer UbIO and then apply an appropriate temperature calibration factor from the memory U102 to correct for the shifting (and possible operation in a non-linear portion of the curve) of the brake control signal with temperature. A suitable non-volatile memory is manufactured and made commercially available by Microchip Technology Inc. (part no. 24C0C). The 24C0C is a 1K byte serial EEPROM and is organized as a single block of 128 by eight-bit memory with a two-wire serial interface for reading/writing to the device.

The microcontroller U5 implements an algorithm using a stored average value (i.e, preferably, a reading is taken every 200 ms with the ten most recent readings being averaged) of the accelerometer output (i.e., the brake control signal), which is compared to the current brake control signal after the brake pedal of the towing vehicle is depressed. This rolling average sets a reference level, which is dependent on mounting and attitude of the towing vehicle. This reference level (i.e., operating point) may be at 1.8 volts, 3.0 volts, or other voltage within the acceptable range set by the mounting constraints. Since the sensitivity of the accelerometer in the horizontal is a function of the cosine of the angle between the sensitive axis and horizontal the microcontroller calculates the correction factor to determine the true acceleration (or deceleration). This allows the microcontroller U5 to determine the duty cycle of the brake output signal to apply to the brake load. Deceleration experienced during even severe braking is typically less than ½ G. Therefore, it can be appreciated that the voltage of the reference might be anywhere along the generally substantially linear portion of the sine wave where there is still room to detect the deceleration.

A change in the brake control signal indicates vehicle deceleration in either a forward or reverse direction (when backing-up). When the microcontroller U5 determines that the current brake control signal has a negative magnitude or a voltage that is below the reference point that was established during the averaging algorithm, the microcontroller U5, causes a brake output signal to be applied to the brake load, if the stop light switch is activated. When the microcontroller U5 determines that the accelerometer input is not changing and that the stop light switch is still engaged, the microcontroller U5 causes the brake output signal to ramp up to a voltage that is a fixed percentage of the power control set point (set by the gain potentiometer V2) after about four seconds, which produces a brake output signal during stopped or static conditions. When the vehicle is stopped and the boost is on, the brake output voltage, preferably, immediately steps to twenty-five percent of the power control set point. Preferably, if the boost switch SW1 is pressed during the ramp function, the boost switch SW1 takes priority and the output voltage immediately changes to twenty-five percent of the power control set point.

As mentioned above, when a brake control signal that varies from a rolling average reference point is provided by the accelerometer U101, the microcontroller U5 is programmed to provide a corresponding brake output signal to a brake load 114 of a towed vehicle. The brake output signal is preferably provided in the form of a pulse width modulated (PWM) signal with a frequency of 250 Hz and a variable duty cycle, preferably, from zero to one-hundred percent. The brake output signal is provided via high-side drivers U2 and U3, which are coupled in parallel and switched by the microcontroller U5 (via pin 12) through an NPN transistor Q7.

A resistor R23 (preferably, 10 k Ω) limits the base current of transistor Q7 and a resistor R4 (preferably, 10 k Ω) pulls the collector of transistor Q7 to the vehicle battery VBATT (provided via connector P1, pin A), when transistor Q7 is turned off. The collector of transistor Q7 is also coupled, through a current limiting resistor R5 (preferably, 10 k Ω) to a gate (pin 2) of high-side drivers U2 and U3. A drain (pin 3) of drivers U2 and U3 is coupled to VBATT and a source (pin 5) of U2 and U3 is coupled to the brake load 114 (FIG. 1A), i.e., the brake electromagnets of the towed vehicle. When transistor Q7 is turned on by the microcontroller U5, drivers U2 and U3 are shut-off and a brake output signal is not provided to the brake load. When microcontroller U5 turns transistor Q7 off, drivers U2 and U3 are turned on and a brake output signal is provided to the brake load 114 of the towed vehicle. A suitable high-side driver is manufactured and made commercially available by ST Microelectronics (part no. VN920). The VN920 is a single channel high-side solid state relay intended for driving any kind of load with one side connected to ground. The VN920 incorporates an internal voltage doubler that provides voltage to drive the gate of an internal n-channel MOSFET to a voltage higher than VBATT. This eliminates the charge-pump circuitry normally needed to drive an n-channel MOSFET. It also permits 100% duty cycle as a minimum off time is not required to recharge the charge-pump capacitor.

The drivers U2 and U3 include a built-in current-sense circuit that produces a current from the sense pin (pin 4), which is proportional to the current delivered to the load by the driver. This current sense output is monitored by the microcontroller U5 (pins 4 and 20) via a filter network including a sense resistor R10, a resistor R3 and a capacitor C11, whose values are preferably 470 Ω, 10 k Ω and 3300 pF, respectively. This allows the microcontroller U5 to measure the current delivered to the load as well as determine whether a current overload condition exists with the brake load.

Microcontroller U5 also monitors the voltage across capacitor C5, via pin 5, to determine whether an open ground or short exists. The voltage across capacitor C5 is divided by resistors R7 (preferably, 47 k Ω) and R13 (preferably, 10 k Ω) before being provided to the microcontroller U5, such that the maximum input voltage to the microcontroller U5 is not exceeded. If the brake control 200 should lose connection to ground because of a broken wire or faulty connection the circuit will still function by conduction through flyback diode D3 and the brake electromagnets to ground. Anytime the output is pulsed, current will be delivered to the electromagnets building up energy in the magnetic field. When the pulse ends, the current will continue to flow and charge C5. The voltage across capacitor C5 will therefore rise above that of the vehicle battery VBATT. If pulsing were to continue the circuit could be damaged by excess voltage. Therefore, when the voltage rises above a preset value (e.g., 18 volts), the microcontroller U5 is programmed to determine that the brake load 114 is missing and provide status information to an operator of the vehicle, via display DS1. When the voltage falls below a preset value (e.g., 8 volts), the microcontroller U5 is programmed to determine that the brake load 114 is shorted and provide status information to an operator of the vehicle, via display DS1.

As discussed above with respect to FIGS. 4A–4O (i.e., the display 106), the microcontroller U5 is programmed to provide appropriate information to an operator of the vehicle, via display DS1, by illuminating an appropriate segment or segments and/or indicators of the seven-segment displays. A suitable display is manufactured and made commercially available by FEMA (part no. DA20).

Referring again to FIG. 3A, three exemplary brake control signal curves 302, 304 and 306 as would typically be provided by the accelerometer U101 are depicted. As mentioned above, a desired no acceleration output of 2.5 volts is indicated at point 301 on curve 302. However, depending upon the mounting orientation of the brake control unit, the output from the accelerometer may shift up or down the curve 302. Preferably, when the brakes of the towing vehicle have not been engaged for five seconds, the microcontroller U5 takes a reading every two-hundred milliseconds, stores ten readings in a first-in first-out (FIFO) buffer and averages the most recent ten readings to determine the magnitude of the offset signal to be applied to the negative input of the internal operational amplifier to cause the output of the accelerometer U101 to, for example, transition from a mounting offset point 303 to the zero acceleration point 301.

The brake control signal curve 304 represents the shifting of the curve 302 with increased temperature and the brake control signal curve 306 represents the shifting of the curve 302 with decreased temperature. As discussed above, a temperature correction factor, stored within the memory U102, is utilized to compensate for temperature variation. That is, the temperature compensation factors allow, for example, the microcontroller U5 to, based on the temperature read from the accelerometer U101, select an appropriate compensation factor such that practically speaking, the accelerometer U101 is operated on a linear portion of curves 304 and 306. Without temperature correction, the zero points may be set at 2.5 volts, i.e., points 305 or 307, which may result in operation into a non-linear portion of curves 304 (on the negative swing) and 306 (on the positive swing).

Figure 3B:
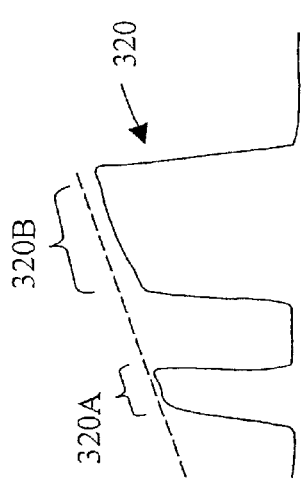
FIG. 3B is a diagram of an exemplary reference signal and an exemplary measurement signal that are utilized to determine whether a brake load is coupled to the brake control unit.

FIG. 3B illustrates an exemplary test signal 320, i.e., a test pulse that is used to determine that the brake load (i.e., the brake electromagnets) is connected to the output of the brake control unit 200. According to one test procedure, a test pulse is provided that consists of two pulses 320A and 320B. A short pulse (i.e., a reference signal) 320A sets the reference level and a longer pulse (i.e., a measurement signal) 320B is then applied to measure the slope or inductive current ramp of the signal. By comparing the measurement of the second pulse against the reference pulse, the microcontroller U5 can determine if the brake electromagnets are open, connected properly to the brake control unit 200 or improperly connected to, for example, stop/turn indicators of the towed vehicle. Alternatively, the longer pulse 320B can be utilized, by itself. The test signal 320 is preferably provided approximately every four seconds. Preferably, the reference pulse 320A has a width of approximately three-hundred ninety-five microseconds followed by an off-time of fifty-five microseconds and the measurements pulse 320B has an on-time of approximately one thousand twenty-five microseconds. As shown, the positive ramp of signals 320A and 320B indicate an inductive load is present When a change is detected from having brake electromagnets connected to not being connected, the display DS1 (106 of FIG. 4J) indicates to the operator, the loss of connection. This is a diagnostic or warning to help alert the operator that a potential intermittent connection or disconnection has occurred. When a brake electromagnet loss is detected, the display DS1 flashes 'n.c' for fifteen seconds at a one-half second rate. If during the fifteen second time period, the brake electromagnets are detected, the display DS1 immediately stops flashing and displays '.c' to indicate a connection. When after fifteen seconds the electromagnets are not connected, the display DS1 stops flashing and illuminates only the power indicator, to indicate power is on. The brake control unit 200 is also capable of detecting and turning off the brake output signal if the sensed brake output current is greater than, for example, twenty amperes or shorted to ground. This may be due to a defective brake electromagnet, a fault to ground and/or wiring problems associated with the trailer, connector or towing vehicle.

As discussed above, the microcontroller U5 also monitors the status of the brake output line at four second intervals to determine whether the brake output line current exceeds a limit (e.g., twenty-eight amperes) and displays 'S.H' on display DS1 to indicate a potential shorted output condition. During each pulse of the brake output signal, a test is performed on the pulse to determine if the current draw is greater than twenty-eight amperes. If so, the brake control unit 200 shuts down for the remainder of the pulse and begins flashing 'O.L' at a one-half second rate on the display DS1. During such a condition, the brake control signal level is preferably reduced to seventy percent of the overload setting for the remainder of the braking event.

The microcontroller U5 also detects and turns off the brake output signal if the ground wire to the microcontroller U5 becomes intermittent or disconnected from the vehicle battery VBATT. This may occur due to a defective wire termination, corroded battery ground terminal or other ground wiring problems. Preferably, during each pulse of the brake output signal, a test is also performed on the measured pulse such that if an open ground is detected, the display DS1 flashes 'O.G.' at a half second rate to alert the operator.

According to another embodiment of the present invention, a processor of a brake control unit is programmed to automatically set at least one of a gain level and a boost level for the brake control unit. The processor of the brake control unit determines an appropriate gain level and/or boost level for the brake unit by performing a number of programmed tasks. Initially, the processor causes a brake output signal to be provided to a brake load of a towed vehicle when a brake pedal of a towing vehicle is depressed and before the brakes of the towing vehicle can respond to the depression of the brake pedal. The processor is also programmed to detect a deceleration of the towed vehicle attributable to the brake output signal. The detected deceleration provides an indication of towed vehicle characteristics, such as brake temperature, brake pad wear, proximity of brake pads to the brake drum, brake magnet strength, brake spring strength, number of axles, load and speed and also provides an indication of the road conditions. It should be appreciated that a brake control unit that is capable of automatically setting a gain level and/or a boost level would not require the potentiometer V2 or the boost switch SW1 and its associated components, i.e., resistor R18 and capacitor C12 (see FIG. 2A).

It should be appreciated that even during rapid depression of a towing vehicle brake pedal there is a period of latency before hydraulic brakes of the towing vehicle are actually applied. Thus, if brakes of a towed vehicle are quickly ramped up after sensing a stoplight signal and before the hydraulic brakes of the towing vehicle can respond a "tug", which is a result of the towed vehicle brake initiation, can be detected. This "tug" provides an indication of the onset of trailer braking and can advantageously be utilized to determine required boost level, obviating the need for a separate boost switch, which has generally been utilized to help a trailer lead a towing vehicle in braking. Thus, when the voltage ramp passes the point of onset of braking, the ratio of deceleration to voltage change can be determined and utilized as a brake effectiveness coefficient, which provides a basis for automatic gain and boost control.

According to another embodiment of the present invention, a brake output signal (i.e., braking voltage) can be modulated at a given rate while the output of the accelerometer is logged. In certain situations it may be difficult to recover the signal provided by the accelerometer and in such case, a recursive filter or other digital signal processing (DSP) technique can be utilized to enhance the detection. For example, a pulse width modulated (PWM) signal with a frequency of 250 Hz may be modulated at a frequency of approximately 1 Hz. In such a case, a recursive filter implemented in, for example, a DSP routine can provide good results as the modulation is at a constant rate. In any case, it is generally desirable to dither the pulse width in small increments to avoid vehicle operator displeasure with the procedure. Dithering the pulse width of the brake output signal periodically during braking allows an average deceleration to be determined, which can advantageously be utilized to set a gain and/or boost level for the brake control unit.

As is discussed above, in brake control units that have included a gain input, an operator of the towing vehicle adjusted the maximum magnitude (i.e., the duty cycle) of a brake output signal that was provided, via a brake load switching circuit, to a brake load (i.e., brake electromagnets) of a towed vehicle (e.g., a trailer). Further, in brake control units that have implemented a boost switch, the operator has added an additional brake output signal at the start of a braking event to compensate for different trailers, trailer weight or other different braking features (e.g., wet or dry road conditions). This has also allowed an operator to provide a more aggressive brake setting when the brake control unit was utilized with, for example, heavy multi-axle trailers. As is also discussed above, alternatively, a variable boost (e.g., set with potentiometer) or incrementally stepped values could be employed.

As is also discussed above, according to one embodiment of the present invention, when a processor of a brake control unit determines that an accelerometer input is not changing and a towing vehicle stoplight switch is still engaged, the processor causes the brake output signal to ramp up to a voltage that is a fixed percentage of the power control set point, which has been set by a gain potentiometer, after a predetermined period of time. This allows the brake control unit to provide a brake output signal during stopped or static conditions. However, during certain conditions, such as with steady application of a brake pedal of the towing vehicle on a very smooth down hill grade, a brake control unit implementing such a ramp function may implement the ramp function while the vehicle is moving, as an output of the accelerometer may provide no indication of movement. Thus, in general, it is desirable to implement a brake load control routine which is capable of determining when a ramp function is implemented while the vehicle is in motion.

Figure 5:
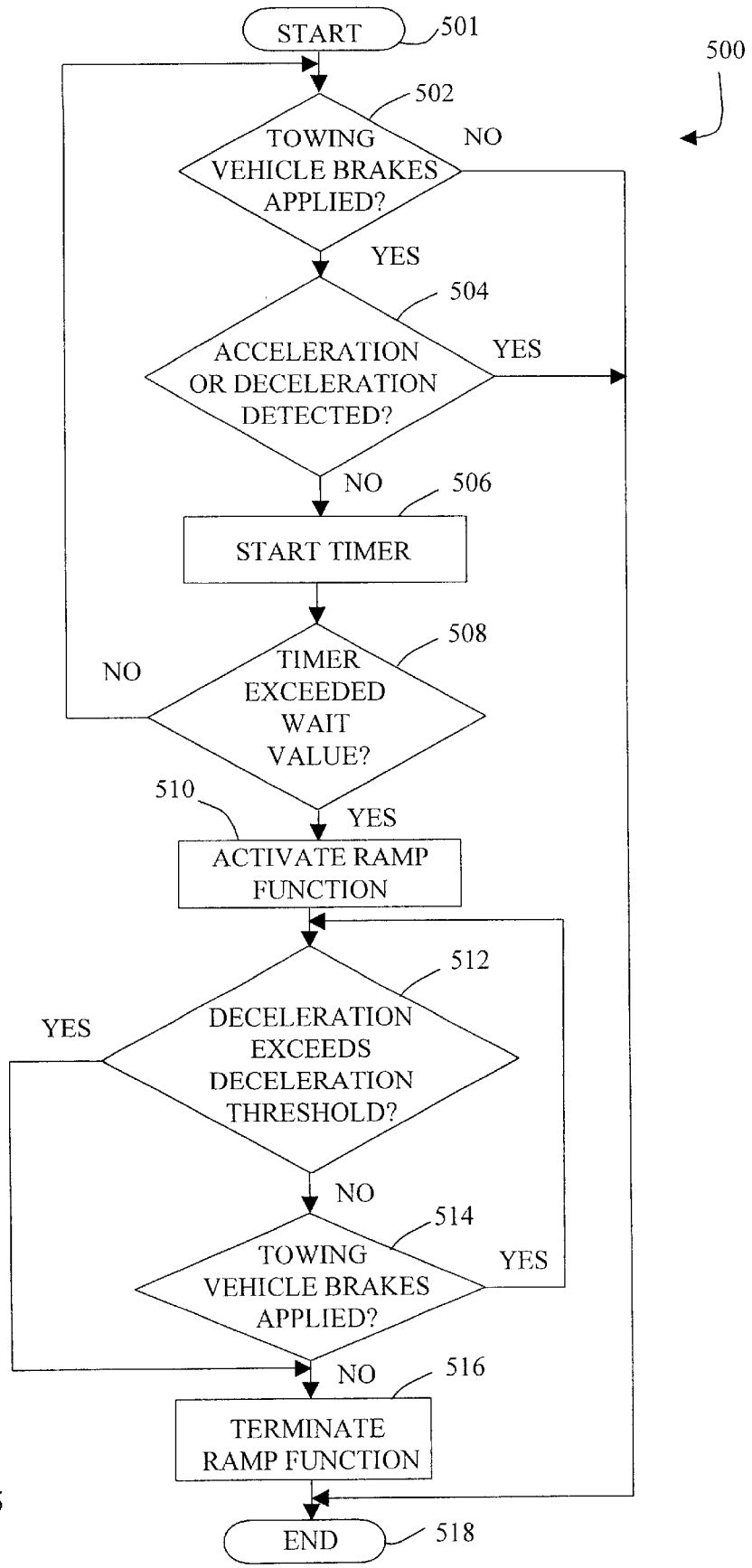
FIG. 5 is a flowchart of a brake load control routine, according to an embodiment of the present invention.

FIG. 5 depicts a flowchart of a brake load control routine 500, which determines if the ramp function is activated when the vehicle is in motion and acts to terminate the ramp function in such a case. The routine 500 is discussed with reference to the brake control unit of FIG. 1A. In step 501, the routine 500 is initiated, at which point control transfers to decision 502. In step 502, the processor 102 determines whether towing vehicle brakes are applied, as is described above. If the towing vehicle brakes are not applied, control transfers from step 502 to step 518, where the routine 500 terminates. However, if the towing vehicle brakes are applied in step 502, control transfers to decision step 504 In step 504, the processor 102 determines whether acceleration or deceleration is detected from the accelerometer 110. If so, control transfers from step 504 to step 518 Otherwise, control transfers from step 504 to step 506, where the processor 102 starts a timer/counter.

Next, in decision step 508, the processor 102 determines whether the timer has exceeded a wait value, which is implemented to provide an indication that the towing vehicle is, in fact, stopped. If the timer/counter has not exceeded the wait value (e.g , 4 seconds), control transfers to step 502. Otherwise, control transfers from step 508 to step 510 where the processor 102 activates the ramp function as described above. Then, in step 512, the processor 102 determines whether the deceleration exceeds a deceleration threshold. That is, the processor 102 determines whether, if the ramp function is active, the towing vehicle is in motion. If the deceleration does not exceed the deceleration threshold, control transfers from step 512 to decision step 514, thus indicating that the towing vehicle is not in motion. Otherwise, control transfers from decision step 512 to step 516, where the processor 102 terminates the ramp function. In step 514, the processor 102 determines whether the towing vehicle brakes are still applied using the method as is described above with respect to FIGS. 2A and 2B. If the towing vehicle brakes are still applied, control transfers from step 514 to step 512. Otherwise, when the towing vehicle brakes are no longer applied, control transfers from step 514 to step 516, where the processor 102 causes the ramp function to terminate. In step 516, control transfers to step 518 where the routine 500 terminates.

Figure 6:
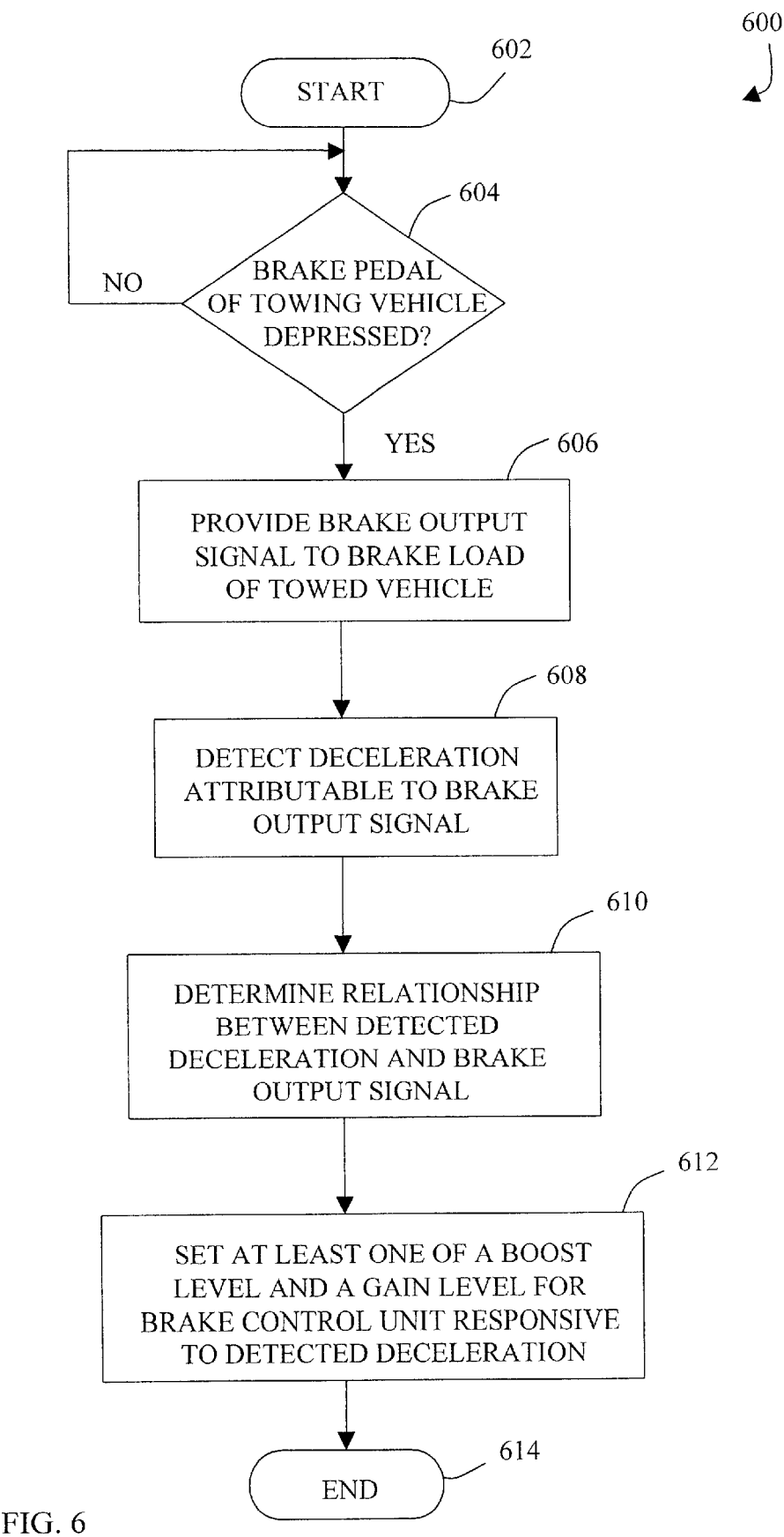
FIG. 6 is a flowchart of an exemplary automatic boost/gain routine, according to an embodiment of the present invention

According to another embodiment of the present invention, an automatic boost and/or gain routine can be implemented by providing a brake output signal to a brake load of a towed vehicle while the towed vehicle is in motion. As is shown in FIG. 6, an automatic boost/gain routine 600, which is discussed with reference to the brake control unit of FIG. 1A, is further illustrated. In step 602, the routine 600 is initiated at which point control transfers to decision step 604. In step 604, the processor 102 determines whether a brake pedal of a towing vehicle is depressed, in a matter similar to that described with respect to FIGS. 2A and 2B above. If the brake pedal is not depressed, control loops on step 604 while the routine 600 is active. Otherwise, control transfers from step 604 to step 606, when the brake pedal of the towing vehicle is depressed. In step 606, the processor 102 causes a brake output signal to be provided to a brake load of the towed vehicle. Next, in step 608, the processor 102 detects deceleration from the accelerometer 110 that is attributable to application of the brake output signal. Then, in step 610, the processor 102 determines the relationship between the detected deceleration and the brake output signal. As is mentioned above, the deceleration of the towed vehicle, with respect to a given brake output signal, provides an indication of the towed vehicle characteristics such as brake pads, temperature, proximity of the brake pads to the brake drum, moisture, road conditions, brake magnet, springs, battery voltage, speed, etc. Thus, the ratio of the deceleration to the brake output signal can be associated with an appropriate value in, for example, a look-up table that is utilized by the processor 102 to determine an appropriate boost level and/or gain level for the brake control unit. Next, in step 612, the processor 102 sets at least one of a boost level and a gain level for the brake control unit responsive to the detected deceleration. Then, in step 614, the routine 600 terminates.

Accordingly, a first routine has been described herein which terminates a ramp function upon detection of deceleration and a second routine has been described herein which allows a gain level and/or boost level to be set automatically.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method for controlling a brake load of a towed vehicle, comprising the steps of:
    providing a fixed brake output signal to the brake load of the towed vehicle when deceleration of a towing vehicle is below a deceleration threshold and a brake pedal of the towing vehicle is depressed; and
    terminating the fixed brake output signal to the brake load of the towed vehicle when the towing vehicle deceleration is above the deceleration threshold and the brake pedal of the towing vehicle is depressed.

2. The method of claim 1, wherein the fixed brake output signal is only provided when the deceleration of the towing vehicle is below the deceleration threshold for a predetermined time period.

3. A method for automatically setting a gain level of a brake control unit that provides a brake output signal to a brake load of a towed vehicle, comprising the steps of:
    providing a brake output signal to the brake load of the towed vehicle when a brake pedal of a towing vehicle is depressed and before brakes of the towing vehicle can respond to the depression of the brake pedal;
    detecting a deceleration in the towed vehicle attributable to the brake output signal, wherein the detected deceleration provides an indication of towed vehicle characteristics; and
    setting a gain level for the brake control unit responsive to the detected deceleration associated with the brake output signal.

4. The method of claim 3, wherein the towed vehicle characteristics include brake temperature, brake pad wear, proximity of brake pads to brake drum, brake magnet strength, brake spring strength, number of axles, load and speed.

5. The method of claim 3, wherein the brake output signal is modulated at a given rate to provide an average deceleration for use in setting the gain level for the brake control unit to an appropriate level.

6. The method of claim 3, wherein the detected deceleration also provides an indication of road conditions.

7. A method for automatically setting a boost level of a brake control unit that provides a brake output signal to a brake load of a towed vehicle, comprising the steps of:
    providing a brake output signal to the brake load of the towed vehicle when a brake pedal of a towing vehicle is depressed and before brakes of the towing vehicle can respond to the depression of the brake pedal;
    detecting a deceleration in the towed vehicle attributable to the brake output signal, wherein the detected deceleration provides an indication of towed vehicle characteristics; and
    setting a boost level for the brake control unit responsive to the detected deceleration associated with the brake output signal, wherein the boost level causes an increased initial braking force to be applied to the brake load when utilized.

8. The method of claim 7, wherein the towed vehicle characteristics include brake temperature, brake pad wear, proximity of brake pads to brake drum, brake magnet strength, brake spring strength, number of axles, load and speed.

9. The method of claim 7, wherein the brake output signal is modulated at a given rate to provide an average deceleration for use in setting the boost level for the brake control unit to an appropriate level.

10. The method of claim 7, wherein the detected deceleration also provides an indication of road conditions.

11. A brake control unit for providing a brake output signal to a brake load of a towed vehicle, comprising:
    a processor,
    an accelerometer coupled to the processor, the accelerometer providing a brake control signal to the processor, wherein the processor is programmed to cause an appropriate brake output signal to be provided to the brake load responsive to the brake control signal; and
    a memory subsystem coupled to the processor, the memory subsystem storing processor executable code which causes the processor to automatically set at least one of a gain level and a boost level for the brake control unit.

12. The brake control unit of claim 11, wherein brake control code causes the processor to perform the steps of:
    providing a brake output signal to the brake load of the towed vehicle when a brake pedal of a towing vehicle is depressed and before brakes of the towing vehicle can respond to the depression of the brake pedal;
    detecting a deceleration in the towed vehicle attributable to the brake output signal, wherein the detected deceleration provides an indication of towed vehicle characteristics; and
    setting the gain level for the brake control unit responsive to the detected deceleration associated with the brake output signal.

13. The brake control unit of claim 12, wherein the brake control code causes the processor to perform the additional step of:
    setting the boost level for the brake control unit responsive to the detected deceleration associated with the brake output signal, wherein the boost level causes an increased initial braking force to be applied to the brake load when utilized.

14. The brake control unit of claim 12, wherein the towed vehicle characteristics include brake temperature, brake pad wear, proximity of brake pads to brake drum, brake magnet strength, brake spring strength, number of axles, load and speed.

15. The brake control unit of claim 12, wherein the brake output signal is modulated at a given rate to provide an average deceleration for use in setting at least one of the gain level and the boost level for the brake control unit to an appropriate level.

16. The brake control unit of claim 12, wherein the detected deceleration also provides an indication of road conditions.

17. A brake control unit for providing a brake output signal to a brake load of a towed vehicle, comprising:
    a processor;
    a brake load switching circuit coupled to the processor, wherein the processor is programmed to cause the brake load switching circuit to couple a towed vehicle battery to the brake load responsive to a brake control signal and thus provide a brake output signal to the brake load;

an accelerometer coupled to the processor, the accelerometer providing the brake control signal to the processor; and a memory subsystem coupled to the processor, the memory subsystem storing processor executable code which causes the processor to automatically set at least one of a gain level and a boost level for the brake control unit.

18. The brake control unit of claim 17, wherein brake control code causes the processor to perform the steps of:

providing a brake output signal to the brake load of the towed vehicle when a brake pedal of a towing vehicle is depressed and before brakes of the towing vehicle can respond to the depression of the brake pedal;

detecting a deceleration in the towed vehicle attributable to the brake output signal, wherein the detected deceleration provides an indication of towed vehicle characteristics; and setting the gain level for the brake control unit responsive to the detected deceleration associated with the brake output signal.

19. The brake control unit of claim 18, wherein the brake control code causes the processor to perform the additional step of:

setting the boost level for the brake control unit responsive to the detected deceleration associated with the brake output signal, wherein the boost level provides an increased initial braking force to be applied to the brake load.

20. The brake control unit of claim 18, wherein the towed vehicle characteristics include brake temperature, brake pad wear, proximity of brake pads to brake drum, brake magnet strength, brake spring strength, number of axles, load and speed.

21. The brake control unit of claim 18, wherein the brake output signal is modulated at a given rate to provide an average deceleration for use in setting at least one of the gain level and the boost level for the brake control unit to an appropriate level.

22. The brake control unit of claim 18, wherein the detected deceleration also provides an indication of road conditions.

23. The brake control unit of claim 17, wherein brake control code causes the processor to perform the additional steps of:

providing a fixed brake output signal to the brake load of the towed vehicle when towing vehicle deceleration is below a deceleration threshold and the brake pedal of the towing vehicle is depressed; and terminating the fixed brake output signal to the brake load of the towed vehicle when the towing vehicle deceleration is above the deceleration threshold and the brake pedal of the towing vehicle is depressed.

24. The brake control unit of claim 23, wherein the fixed brake output signal is only provided when the towing vehicle deceleration is below the deceleration threshold for a predetermined time period.

* * * * *

UNITED STATES PATENT AND TRADEMARK OFFICE
CERTIFICATE OF CORRECTION

PATENT NO.     : 6,615,125 B2
DATED          : September 2, 2003
INVENTOR(S)    : Larry Eccleston et al.

It is certified that error appears in the above-identified patent and that said Letters Patent is hereby corrected as shown below:

Column 4,
Line 22, "e g.," should be -- e.g., --;

Column 6,
Line 18, "47 k Ω" should be -- 4.7kΩ --;
Line 18, "47 $\mu$F" should be -- 4.7$\mu$F --;

Column 7,
Line 5, "Ub1O" should be -- U101 --;
Line 11, both instances of "24C0C" should be -- 24C01C --; and Column 9,
Line 57, after "present" insert -- . --.

Signed and Sealed this

Eighteenth Day of May, 2004

JON W. DUDAS
*Acting Director of the United States Patent and Trademark Office*